United States Patent [19]

Najork et al.

[11] Patent Number: 5,634,392
[45] Date of Patent: Jun. 3, 1997

[54] PRESSURE MEDIUM OPERABLE CYLINDER/PISTON UNIT

[75] Inventors: Rolf Najork, Bergisch Gladbach; Thomas Wollny, Cologne, both of Germany

[73] Assignee: Ford Motor Company, Dearborn, Mich.

[21] Appl. No.: 559,754

[22] Filed: Nov. 15, 1995

[30] Foreign Application Priority Data

Dec. 7, 1994 [DE] Germany ............... 44 43 472.3

[51] Int. Cl.$^6$ ................................ F01C 9/00
[52] U.S. Cl. ..................................... 92/121
[58] Field of Search ............... 02/120, 122, 121; 91/61, 210

[56] References Cited

U.S. PATENT DOCUMENTS

| | | | |
|---|---|---|---|
| 2,350,066 | 5/1944 | Parker | 92/121 X |
| 4,169,404 | 10/1979 | Tsuchihashi | 91/61 |
| 5,367,943 | 11/1994 | Stoll et al. | 91/61 X |

FOREIGN PATENT DOCUMENTS

| | | |
|---|---|---|
| 3017464C2 | 11/1980 | Germany . |
| 3701690A1 | 8/1988 | Germany . |
| 0859675 | 8/1981 | U.S.S.R. ............... 92/121 |
| 0868138 | 9/1981 | U.S.S.R. ............... 92/121 |

OTHER PUBLICATIONS

Olhydraulik Grundlagen und Anwendung, Prof. E. M. Chaimowitsch, Dr. Der Technischen Wissenschaften, Veb Verlag Technik Berlin, 1958, Hydraulische Triebe der Werkzeugmaschinen, p. 106.

Werner Dieter Oelhydraulikfibel, Krausskopf-Verlag, Wiesbaden 1960 Oelhydraulik und Pneumatic-Buchreihe, p. 148.

*Primary Examiner*—Hoang Nguyen
*Attorney, Agent, or Firm*—James J. Dottavio

[57] ABSTRACT

In a pressure medium operable cylinder/piston unit for the provision of at least one rotary movement, comprising a cylinder bore (8) having inside it a radially internally projecting partition wall (4) and a vane piston (5) which projects radially outwardly from a piston rod (3) extending through the cylinder housing (2) and forms two alternately pressurisable radial pressure chambers (26 and 27), the radial partition wall (4) and the radial vane piston (5) are arranged on the piston rod (3) adjacent an axial piston (6) which, together with the cylinder bore (8), forms outer pressure chamber (14), and the radial partition wall (4) is arranged in the cylinder (2) so that, by way of a projection (18), it is secured against rotation.

10 Claims, 2 Drawing Sheets

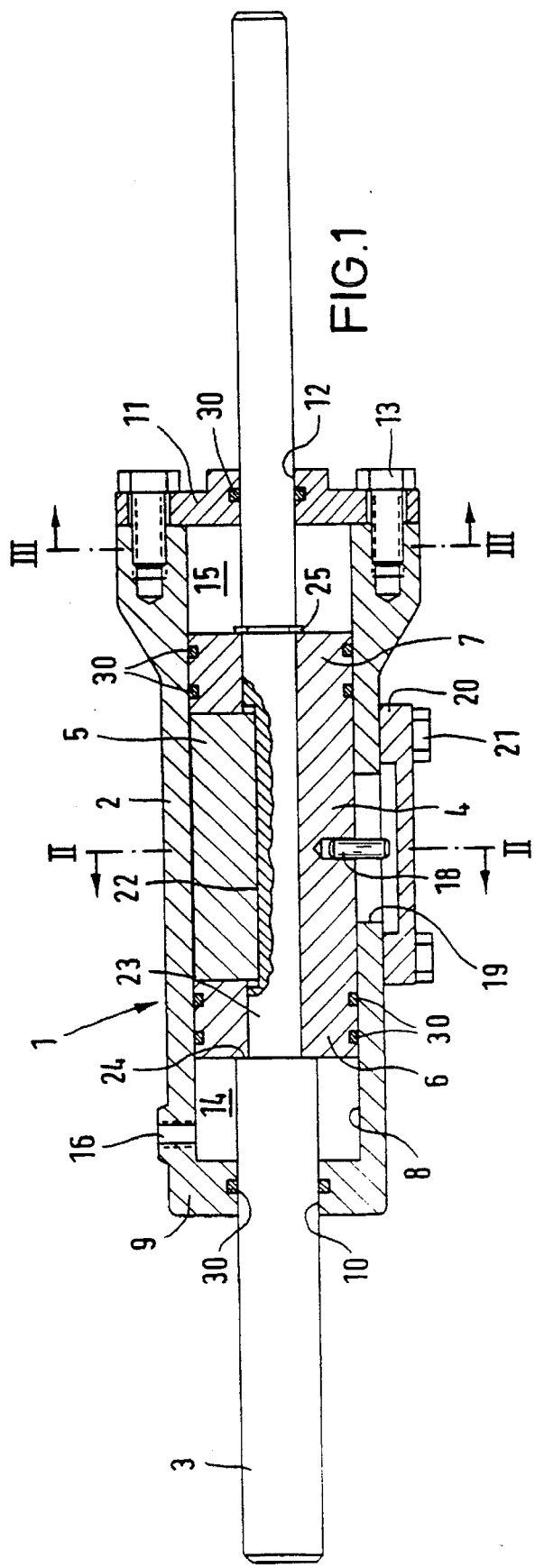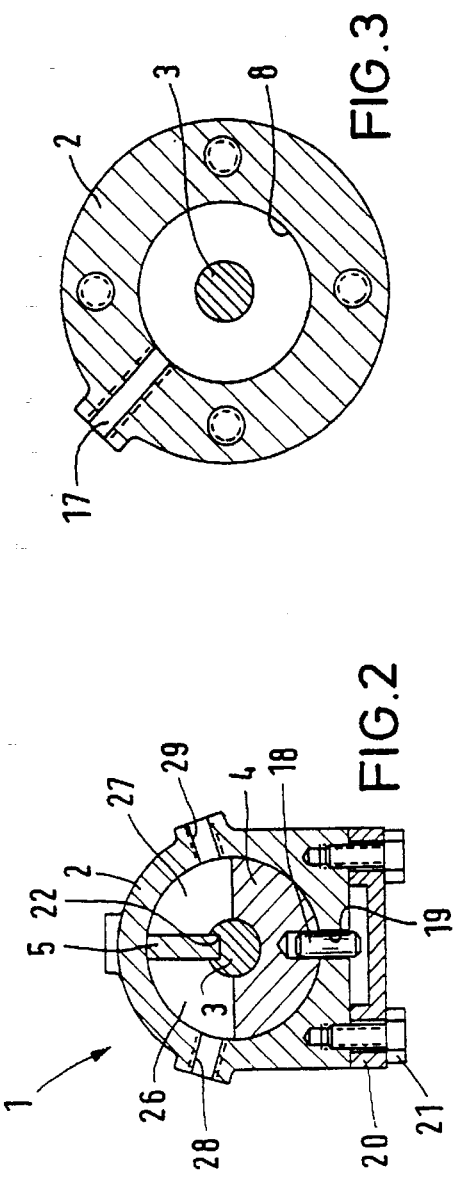

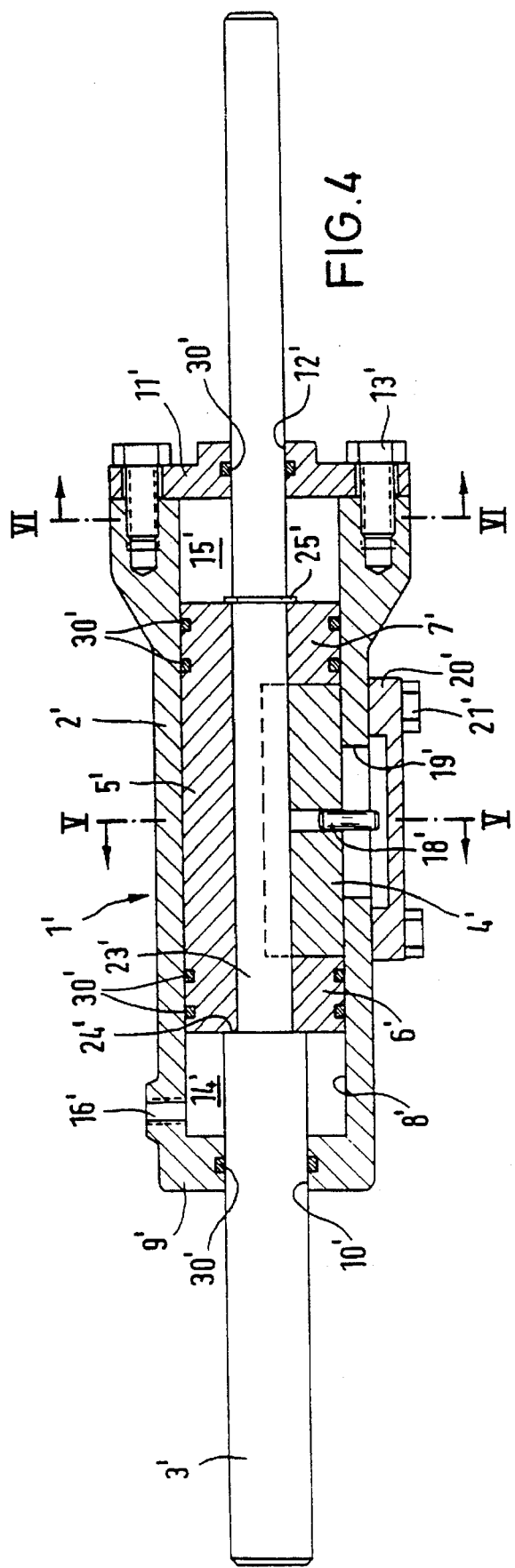
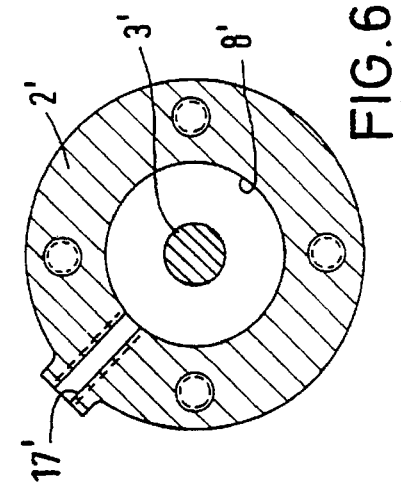
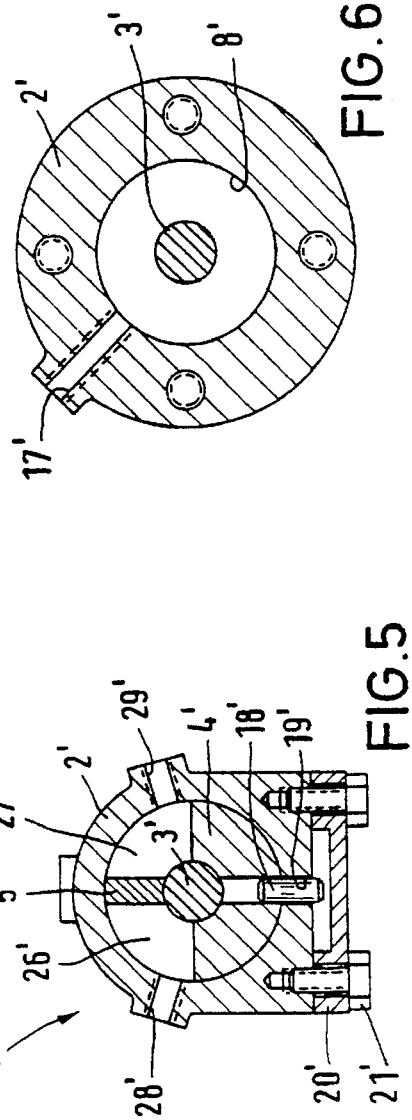

PRESSURE MEDIUM OPERABLE CYLINDER/PISTON UNIT

BACKGROUND OF THE INVENTION

1. Field of the Invention

The invention relates to a pressure medium operable cylinder/piston unit for the provision of at least one rotary movement.

2. Description of the Prior Art

From the books "Ölhydraulik: Grundlagen und Anwendungen" by Prof. E. M. Chaimowitsch, VEB Verlag Technik, Berlin 1958, page 224, and "Ölhydraulikfibel" by Werner Dieter, Krausskopf-Verlag, Wiesbaden 1960, page 148, pressure medium operable cylinder/piston units for providing a rotary movement are known, but there is no hint to be found there that both a rotary movement and a longitudinal movement can be provided simultaneously in a cylinder/piston unit.

Although pressure medium operable cylinder/piston units are generally known which perform a longitudinal movement and which also make a simultaneous rotary movement by means of screw threads and the like, such arrangements are not suitable for the separate selective control of a rotary movement and a longitudinal movement.

Separately controllable rotary and longitudinal movements are extremely advantageous for use in hydraulically operated gear shifting mechanisms in change-speed gearboxes. The pressure medium operable cylinder/piston units previously used in this field have made these two different movements available, but always by means of separate units.

From German Patent 30 17 464, a pressure medium operable gear shifting aid for a manual change-speed gearbox is known, wherein a gearshift rod can be operated by a rotary piston to engage the gear speeds. However, to select different shifting arms of various gearshift rods, the striker is arranged axially displaceably on the gearshift rod and must be axially displaced by the driver personally. Thus, the gear shifting aid only makes hydraulic support available for the engagement of the gear speeds.

From German published Patent Application 37 01 690, a servo drive for the operation of a gearshift rod of a change-speed gearbox of a motor vehicle is known, which makes available both a rotary and a longitudinal movement of gearshift rod by means of alternately pressurisable pressure chambers, but here the rotary movement is obtained through a kind of crank mechanism and the pressure chambers are in the form of membrane pressure chambers.

It is an object of the invention to provide a pressure medium operable cylinder/piston unit, which can in particular be used for the automatic shifting of a change-speed gearbox of a motor vehicle, and which makes available both a rotary selection movement required for the preselection of the gate arm for the gear speed and also a longitudinal engaging movement required for the engagement of the gear speed.

SUMMARY OF THE INVENTION

The present invention provides a cylinder/piston unit which provides both a rotary selection movement and also a longitudinal engaging movement during the automatic shifting of a change-speed gearbox of a motor vehicle.

The cylinder/piston unit is comprised era a cylinder with a piston rod extending through the bore of the cylinder and a partition wall projecting radially from the cylinder to the piston rod. A pin projects through the cylinder into the partition wall to prevent rotation of the partition wall when the cylinder rod rotates. A vane piston is carried on the piston rod, and projects radially outwardly from the piston rod to the cylinder to form two alternately pressurisable chambers between the partition wall and vane piston. The cylinder rod also supports a piston, located within the bore of the cylinder adjacent a first end of the partition wall, forming a cavity between the end of the cylinder and the piston.

BRIEF DESCRIPTION OF THE DRAWINGS

The invention will now be further described, by way of example with reference to two embodiments illustrated in the drawings, in which:

FIG. 1 is a vertical section through a cylinder/piston unit in accordance with the invention:

FIG. 2 is a section along the line II—II in FIG. 1;

FIG. 3 is a section along the line III—III in FIG. 1;

FIG. 4 is a vertical section through a second embodiment of a cylinder/piston unit in accordance with the invention;

FIG. 5 is a section along the line V—V in FIG. 4; and

FIG. 6 is a section along the line VI—VI in FIG. 4.

DETAILED DESCRIPTION OF PREFERRED EMBODIMENTS

The embodiment of a pressure medium operable cylinder/piston unit 1, shown in FIGS. 1 to 3, consists essentially of a cylinder housing 2, a piston rod 3, a radial partition wall 4, a radial vane piston 5 and two axial pistons 6 and 7.

The cylinder housing 2 is provided with a cylinder bore 8 and has in one end wall 9 a through opening 10 for the piston rod 3 and at its other end, in a cap 11, a through bore 12 for the other end of the piston rod 3. The cap 11 is connected to the cylinder housing 2 by suitable means, e.g., by screws 13. The cylinder bore 8 forms pressure chambers 14 and 15, lying outside the axial piston arrangement 6/7, which can be alternately pressurised with pressure medium through respective connecting bores 16 and 17.

In the present embodiment, the radially inwardly projecting partition wall 4 is formed in one piece with the two axial pistons 6 and 7 and is secured against rotation by a projection means, such as a pin 18 which can move axially in a slot 19 in the wall of the cylinder housing 2. The region of the slot 19 is sealed from the outside by means of a cap 20 which is held in place by screws 21. Alternatively, the partition wall could be prevented from rotating by using a tongue-and-groove interface (not shown) to engage the cylinder.

The vane piston 5 is arranged rotatably between the two axial pistons 6 and 7 and is secured in a groove 22 in a reduced diameter section 23 of the piston rod 3 by adhesion, brazing, or the like. The reduced diameter region 23 of the piston rod 3 forms a shoulder 24, which forms a bearing face for the piston-partition wall-piston arrangement 6/4/7, which is secured axially on the piston rod 3 by means of a circlip 25.

Between the two axial pistons 6 and 7 the vane piston 5 forms two radially separated pressure chambers 26 and 27, which can be selectively pressurised with pressure medium through respective connections 28 and 29.

On the respective axial pistons 6 and 7 and on the through openings of the piston rod, respective O-ring seals 30 can, of course, be provided.

In the region of the vane piston 5, which can move in the cylinder housing 2 relative to the cylinder bore 8 and relative to the adjacent axial pistons 6 and 7, only close fits or inserted sealing means are provided, since for the selection movement, which is all that is needed here, some leakage losses are acceptable. Once the gear speed has been engaged through the longitudinal movement, the corresponding pressure chambers can be relieved of the pressure medium pressure.

In the second embodiment of the invention, shown in FIGS. 4 to 6, the substantially corresponding parts are referred to by the same reference numerals, but with the addition of dashes.

The cylinder/piston unit 1' again consists of a cylinder housing 2' which receives a piston rod 3'. A radially inwardly projecting partition wall 4' and a radially projecting vane piston 5' are again arranged between two axial pistons 6' and 7'.

The further construction of the cylinder/piston unit, in accordance with the invention, essentially corresponds to the construction of the embodiment described with reference to FIGS. 1 to 3, and accordingly does not need to be described again in detail. Only the importer difference from the first embodiment is referred to below.

In contrast to the first embodiment, in which the radially inwardly projecting partition wall 4 and the axial pistons 6 and 7 were integrated to form a one-piece component, in the second embodiment the radial vane piston 5' is combined with the axial pistons 6' and 7' to form one component and the radially inwardly projecting partition wall 4' is inserted as a separate component between the two axial pistons 6' and 7'. The radial partition wall 4' is again guided longitudinally movably by means era pin 18' in a slot 19' in the wall of the cylinder housing 2', but is secured against rotation.

Here, again, the corresponding regions of the axial pistons and of the through openings are provided with respective O-ring seals 30' and the regions on the radially inwardly projecting partition wall 4' and on the radial vane piston 5' are sealed by means of respective close fits, since some leakage can be permitted here.

In the region of the radial vane piston and of the radial partition wall, the radially and axially extending lip seals known from the technical literature can, of course be used.

What is claimed is:

1. A cylinder/piston unit for the provision of at least one rotary movement, comprising:
    a cylinder having a bore;
    a piston rod extending through the cylinder within the bore;
    a partition wall projecting radially from said cylinder to said piston rod;
    a projection means for preventing relative rotation between said partition wall and said cylinder having a means for permitting axial movement therebetween;
    a vane piston supported for rotation by said piston rod, said vane piston projecting radially outwardly from said piston rod to the bore of said cylinder forming two alternately pressurisable radial pressure chambers between said partition wall and said vane piston; and
    a second piston supported by said piston rod, said second piston being located within the bore of said cylinder adjacent a first end of said partition wall and forming a cavity between the end of said cylinder and said second piston.

2. A cylinder/piston unit according to claim 1, wherein the projection means comprises a pin projecting through said cylinder into said partition wall to prevent rotation therebetween.

3. A cylinder/piston unit according to claim 1, wherein the projection means comprises a tongue and groove interface between said projection wall and said cylinder.

4. A cylinder/piston unit for the provision of at least one rotary movement, comprising:
    a cylinder having a bore;
    a piston rod extending through the cylinder within the bore;
    a partition wall projecting radially from said cylinder to said piston rod;
    a projection means for preventing relative rotation between said partition wall and said cylinder having a means for permitting axial movement therebetween comprising a pin projecting through said cylinder into said partition wall to prevent rotation therebetween, and an axial slot provided in said cylinder, thereby allowing said pin to translate axially, but preventing rotation thereof;
    a vane piston supported for rotation by said piston rod, said vane piston projecting radially outwardly from said piston rod to the bore of said cylinder forming two alternately pressurisable radial pressure chambers between said partition wall and said vane piston; and
    a second piston supported by said piston rod, said second piston being located within the bore of said cylinder adjacent a first end of said partition wall and forming a cavity between the end of said cylinder and said second piston.

5. A cylinder/piston unit according to claim 4, further comprising a third piston supported by said cylinder rod positioned adjacent a second end of said partition wall, creating a second cavity between the second end of said cylinder and said third piston.

6. A cylinder/piston unit according to claim 5, wherein the partition wall, first piston, and second piston are integrally formed.

7. A cylinder/piston unit according to claim 6, wherein said piston rod has a slot therein and said vane piston is fixedly secured thereto.

8. A cylinder/piston unit according to claim 7, wherein the partition wall, first piston, and second piston are a one-piece integral member.

9. A cylinder/piston unit according to claim 5, wherein the vane piston, first piston, and second piston are integrally formed.

10. A cylinder/piston unit according to claim 5, wherein the vane piston, first piston, and second piston are a one-piece integral member.

* * * * *